Jan. 22, 1963 D. M. KLEIN 3,074,231
ANNULAR STREAM VARIABLE AREA INJECTOR
Filed March 30, 1960

*INVENTOR.*
DAVID MARSHALL KLEIN
BY

*J. C. Muller*
ATTORNEYS.

United States Patent Office 3,074,231
Patented Jan. 22, 1963

3,074,231
ANNULAR STREAM VARIABLE AREA INJECTOR
David Marshall Klein, Miami, Fla., assignor to the United States of America as represented by the Secretary of the Navy
Filed Mar. 30, 1960, Ser. No. 18,773
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to liquid propellant metering and injecting apparatus for rocket motors and more particularly to such apparatus for bi-propellant type of rocket motors, to simultaneously meter the flow rates of both propellants and inject them into a combustion chamber.

The various prior art devices are somewhat unsatisfactory in that they introduce a pressure drop in the propellant supply line between the supply source and the point of injection into the rocket motor, which pressure drop is not constant over the full range of flow rates. Unless the throttling range is curtailed, or greatly increased propellant supply pressures are employed to maintain a desired flow rate and velocity relationship at the point of injection, non-uniform injection results with attendant combustion instability and in increased likelihood of destructive backfiring.

It is an object of the present invention to provide improved apparatus of the type referred to in which the pressure drop occurring between the supply source and the point of injection is constant over the entire range of flow rates.

Another object is to provide apparatus as aforesaid which injects propellants into a combustion chamber at a constant mixture ratio over the entire range of flow rates.

Another object is to provide apparatus as aforesaid, which when employed with an oxidant and a fuel, obviates undesired accumulation of fuel in the combustion chamber in starting and stopping.

Other objects and many of the attendant advantages of this invention will become readily appreciated as the same becomes better understood by reference to the following detailed description when considered in connection with the accompanying drawing wherein.

Figure 1:
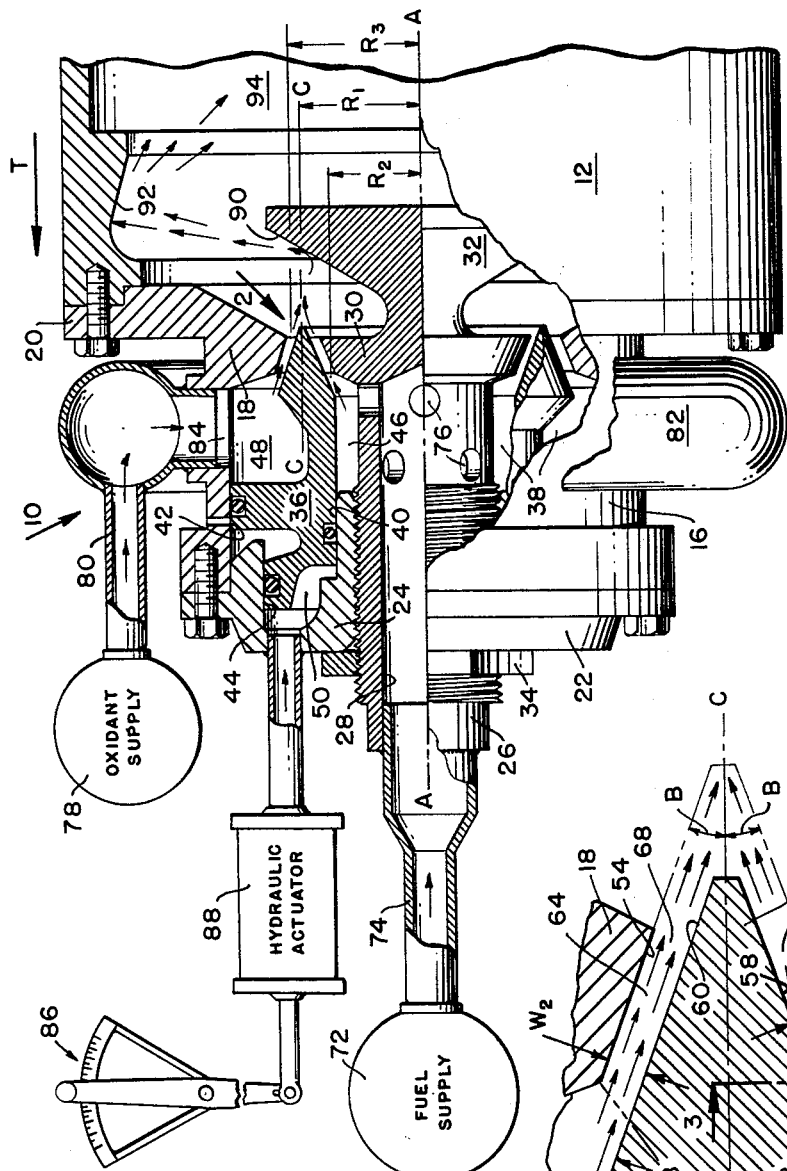
FIG. 1 is a side elevation with a portion shown in longitudinal section of the device of the present invention attached to the front end of a rocket motor tube.

Referring to the drawings and in particular to FIG. 1, a metering and injecting assembly 10 is secured to an end of a typical rocket motor tube 12 as part of a thrust generating system, the interior of motor tube 12 providing a combustion chamber. In normal rocket motor operation a liquid oxidant and a liquid fuel are injected into the interior of the rocket motor tube through assembly 10, there reacting to produce gases which are discharged through a nozzle (not shown) disposed at the other end of the rocket motor providing thrust in a forwardly direction, as shown by arrow T.

Assembly 10 comprises a cylindrical casing 16 having a neck 18 formed at its rear end and affixed to the forward end of motor tube 12 by a flange 20 having bolt holes in registry with corresponding holes in the motor tube, casing 16 being aligned with longitudinal axis A—A of motor tube 12. Affixed to the forward end of casing 16 is a closure wall 22 having formed thereon a central cylindrical sleeve 24 having threads formed on its inner surface, which sleeve projects rearwardly into the space enclosed by casing 16. A cylindrical core 26 having threads formed along its exterior surface is threaded into sleeve 24 with one end projecting forwardly from closure wall 22 and with a central portion extending within the space enclosed by casing 16 and with the other end projecting into the interior of motor tube 12, core 26 further having a central bore 28 extending from the end projecting from closure wall 22 through a majority of the length of core 26. Formed on core 26 are a collar 30 axially disposed opposite neck 18, and a heat shield baffle 32, formed at the end of core 26 which projects into the interior of the motor tube. A lock nut 34 engages the end of core 26 projecting from closure wall 22, rigidly securing core 26 to closure wall 22, such lock nut arrangement also permitting adjustment of the axial position of core 26 for purposes to be hereinafter discussed. A piston 36 is slideably disposed in a piston chamber 38 formed by casing 16, closure wall 22 and core 26, for axial movement therein, piston 36 being so shaped to provide piston surfaces 40, 42 and 44 which engage corresponding axially extending surfaces of chamber 36, the piston surfaces dividing piston chamber 38 into compartments 46, 48 and 50, each sealingly isolated from the others by O-rings disposed in the piston surfaces.

Figure 2:
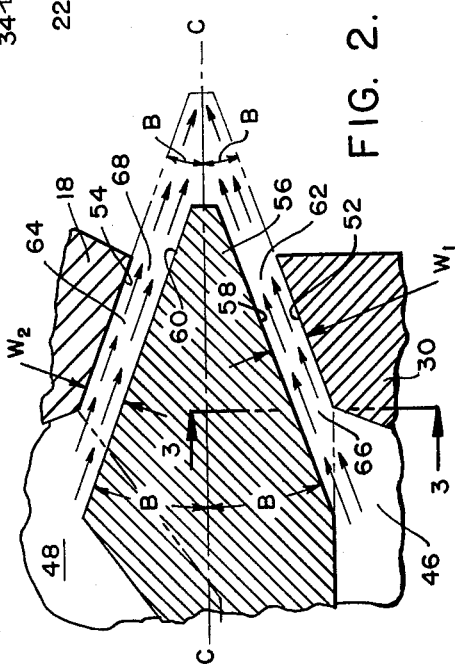
FIG. 2 is enlarged detail indicated by arrow 2, FIG. 1.
Figure 3:
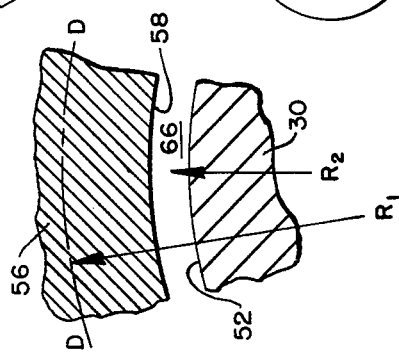
FIG. 3 is a section taken along line 3—3, FIG. 2.

A frustoconical surface 52, FIG. 2, is formed on collar 30, such surface being inclined at an angle B to a reference right cylindrical surface formed about axis A—A and having a radius represented by $R_1$, FIGS. 1 and 3, disposed midway between neck 18 and collar 30, which reference surface intersects the plane of FIG. 2 along line C—C and the plane of FIG. 3 along line D—D. A frustoconical surface 54 is formed on neck 18, and is also inclined at an angle B to the reference cylindrical surface, surfaces 52 and 54 converging in the rearward direction. Collar 30 and neck 18 comprise a closure wall of motor tube 12 and surfaces 52 and 54 comprise the inner and outer surfaces of an annular opening in such closure wall, such annular opening having the shape of a truncated isosceles triangle with its vertex disposed toward the interior of motor tube 12 in the plane of FIGS. 1 and 2. At the rear end of piston 36 there is formed an annular valve member 56 having an inner and outer frustoconical surface 58 and 60 respectively, each inclined at angle B to the reference cylindrical surface, which frustoconical surfaces are adapted to mate with and abut against surfaces 52 and 54 when valve member 56 is in its closed position shown by phantom lines, FIG. 2. When valve member 56 is moved forwardly from its closed position, an inner annular channel 62 divergent relative to axis A—A in the rearward direction, is formed between surfaces 52 and 58 and an outer annular channel 64 convergent relative to axis A—A in a rearwardly direction, is formed between surfaces 54 and 60. It will be apparent that the transverse width of the inner and outer annular channel $W_1$ and $W_2$, respectively, are uniform along the entire length of the respective channels and that $W_1$ and $W_2$ are equal at all positions of valve member 56, their magnitudes being determined by the position of valve member 56 relative to its closed position. For all practical purposes, the transverse areas of the channels at any point along their respective lengths may be calculated using the general formula for the area of an annulus, that is $$\text{Area} = 2\pi R W$$

where R is the radial distance from the axis to the middle of the channel and W is the width of the annulus. For example, the transverse area of channel 62 at end 66 is $$\text{Area} = 2\pi R_2 W_1$$

where $R_2$, FIGS. 1 and 3, is the mean radial distance from axis A to the channel 62 at end 66. Since the radial distance from axis A to channels 62 and 64 varies along their length, the transverse areas of the channels are not uniform along their length. A zone of minimum transverse area of channel 62 exists at end 66, where the radial distance from axis A to the channels 62, is minimum, being equal to $R_2$, and a zone of minimum transverse area of channel 64 exists at end 68, where the radial distance from axis A is minimum, being equal to $R_3$, FIG. 1. It will be also apparent that since $W_1$ and $W_2$ are equal at all positions of valve member 56, the transverse area of channels at their respective zones of minimum area are proportional to one another at all positions of said valve member.

In operation, liquid fuel is stored in tankage of the type adapted to deliver the fuel at a substantially constant pressure over the entire period of rocket motor operation, schematically represented by tank 72, and is fed to compartment 46 through a conduit 74 to bore 28 and thence through ports 76, 76 formed in the wall of core 26 into compartment 46, these conducting passageway elements being of sufficient size to communicate the fuel from tank 72 to end 66 of channel 62 with substantially no pressure drop. Liquid oxidant, stored in similar tankage 78 is fed to compartment 48 in like manner through a conduit 80, a manifold 82 encircling assembly 12, and four ports 84 formed in casing 16 and spaced 90° apart. Hydraulic fluid in compartment 50, having a controllably variable pressure as determined by any suitable hydraulic device represented schematically as a manual throttle 86 and a hydraulic actuator 88, is employed to actuate piston 36, the location of the piston being determined by the difference between the variable pressure of the hydraulic fluid in compartment 50 applied against the front end of the piston and a constant pressure suitably applied against the rear end of the piston, as for example, by the constant pressure of the liquid oxidant in compartment 48 as shown, or by a suitable mechanical spring not shown. Assuming valve member 56 is moved away from its closed position, liquid fuel and liquid oxidant flow into combustion chamber 12 through inner and outer annular channels 62 and 68, respectively, as shown by flow arrows, FIG. 2, at flow rates determined by the transverse areas at the respective zones of minimum areas of the channels, entering combustion chamber 12 in the form of converging annular jets, which jets impinge on one another a short distance beyond valve member 56, such jets thereafter being deflected about baffle 32, as diagrammatically represented by flow arrows, FIG. 1, by a deflecting surface 90 formed on heat shield baffle 32 and a co-operating deflecting surface 92 formed on the interior wall of motor tube 12, to a combustion zone 94 rearward of baffle 32. It will be apparent that since the propellants are fed from the tankage directly to channels 62 and 64 with substantially no pressure drop, the entire pressure drop between the tankage and the points of injection occurs across the channels, and that since the minimum transverse areas of channels 62 and 64 are proportional at all positions of valve member 56, the ratio of flow rates therethrough remains constant under positioning of valve member 56. Exhaustive tests of the device have revealed that it delivers the liquid propellants into the interior of motor tube 12 at a substantially constant pressure of delivery, constant flow velocity, and constant mixture ratio over the entire range of flow rates of metering valve and injector assembly 10, with the propellants delivered to combustion zone 94 in the form of an intimately mixed and atomized spray pattern conducive to optimum combustion.

Core 26, which as hereinbefore described is axially adjustable, is preferably so positioned relative to neck 18 that surface 52 is slightly forward of surface 54 so that as valve member 56 is moved to its closed position surface 52 engages surface 58 shortly before final movement of surface 60 into engagement with surface 54 thereby shutting off flow of fuel into the interior of the motor tube shortly before shutting off flow of oxidant. Conversely, in moving valve member 56 away from its closed position surfaces 52 and 58 remain in engagement shortly after initial movement of surface 60 away from surface 54 thereby permitting oxidant to flow into the interior of the motor tube shortly before the fuel. It will be apparent that this arrangement provides pre-flow and after-flow of oxidant into the chamber during starting and stopping operations, which obviates the accumulation of unburned fuel in the combustion chamber in starting and stopping, which accumulation causes undesired transient phenomena in starting, sometimes called "Hard starts."

Obviously many modifications and variations of the present invention are possible in the light of the above teachings. It is therefore to be understood that within the scope of the appended claim the invention may be practiced otherwise than as specifically described.

What is claimed is:

Liquid propellant metering and injecting apparatus for a reaction motor comprising, in combination, an annular opening formed in a wall of the reaction motor combustion chamber, said opening having inner and outer frustoconical surfaces, said inner and outer surfaces of the annular opening being convergingly inclined toward one another in the direction of the combustion chamber and inclined at same angles to a reference cylindrical surface contained within said annular opening, a valve member adapted for movement along the axis of said reference surface having an annular portion having frustoconical inner and outer surfaces formed thereon inclined at like angles to said reference surface and adapted to mate with said inner and outer surface of the annular opening, said valve member adapted to provide an inner annular metering channel of uniform width and an outer annular metering channel of uniform width, each of said channels having a receiving end and a discharge end opening to the interior of the combustion chamber, said channels adapted to meter propellant flow rate at their respective zones of minimum transverse area, said channels being of variable minimum transverse area under positioning of said valve member, said channels having minimum transverse areas proportional to one another at all positions of said valve member whereby the ratio of flow rates therethrough remains constant under positioning of said valve member, means for controllably moving said valve member, and first and second conduit means of sufficient size for conveying first and second liquid propellants at substantially constant supply pressure to the receiving end of one and the other of said channels, respectively, said valve member with said frustoconical surfaces of the annular opening in the combustion chamber wall constituting the sole means for metering the liquid propellants, whereby the entire pressure drop between the inlets of said conduit means and the combustion chamber occurs across said channels.

References Cited in the file of this patent
UNITED STATES PATENTS

| 2,085,800 | Goddard | July 6, 1937 |
| 2,555,085 | Goddard | May 29, 1951 |
| 2,810,259 | Burdett | Oct. 22, 1957 |
| 2,936,577 | Amneus | May 17, 1960 |

FOREIGN PATENTS

| 121,076 | Great Britain | Dec. 5, 1918 |